(12) United States Patent
Bern et al.

(10) Patent No.: US 11,774,360 B2
(45) Date of Patent: Oct. 3, 2023

(54) METHOD FOR DETERMINING RELATIVE DEGREES OF REFLECTANCE OF A MEASUREMENT SURFACE

(71) Applicant: Fraunhofer-Gesellschaft zur Fordergung Der Angewandten Forschung e.V., Munich (DE)

(72) Inventors: Gregor Bern, Freiburg (DE); Peter Schöttl, Freiburg (DE); Anna Heimsath, Freiburg (DE); Peter Nitz, Freiburg (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 339 days.

(21) Appl. No.: 17/282,422

(22) PCT Filed: Sep. 30, 2019

(86) PCT No.: PCT/EP2019/076475
§ 371 (c)(1),
(2) Date: Apr. 2, 2021

(87) PCT Pub. No.: WO2020/070076
PCT Pub. Date: Apr. 9, 2020

(65) Prior Publication Data
US 2021/0381970 A1    Dec. 9, 2021

(30) Foreign Application Priority Data
Oct. 2, 2018    (DE) .......................... 102018124368.5

(51) Int. Cl.
*G01N 21/55* (2014.01)
*F24S 50/20* (2018.01)
*F24S 23/70* (2018.01)

(52) U.S. Cl.
CPC .............. *G01N 21/55* (2013.01); *F24S 50/20* (2018.05); *F24S 23/70* (2018.05); *G01N 2201/06113* (2013.01)

(58) Field of Classification Search
CPC ........... G01N 21/55; G01N 2201/06113; F24S 50/20; F24S 23/70
See application file for complete search history.

(56) References Cited

U.S. PATENT DOCUMENTS 5,747,813 A * 5/1998 Norton ............... G01B 11/0625
                                                  250/339.11
5,926,262 A * 7/1999 Jung .................... G01N 21/255
                                                  356/600

(Continued)

FOREIGN PATENT DOCUMENTS

CN    101490532       7/2009
CN    109373931 B  * 11/2020  ........... G01B 11/002

(Continued)

OTHER PUBLICATIONS

Fernandez-Garcia, Aranzazu et al.: "Equipment and methods for measuring reflectance of concentrating solar reflector material", In: Solar Energy Materials and Solar Cells, vol. 167, pp. 28-52, Apr. 6, 2017.

(Continued)

*Primary Examiner* — Dominic J Bologna
*Assistant Examiner* — Jarreas C Underwood
(74) *Attorney, Agent, or Firm* — Volpe Koenig

(57) ABSTRACT

A method for determining relative degrees of reflectance of a measurement surface, having the method steps of applying measurement radiation to the measurement surface, such that a measurement spot is produced on the management surface, moving the measurement spot along at least a first straight measurement spot path, over the measurement surface in accordance with a first path movement and along a second straight measurement spot path with a second path movement, recording a first and second image sets of a plurality of locally resolved images of the measurement surface during the first path movement and the second path movement. An evaluation is carried out at intersection points, whose location points on the management surface are defined by evaluation lines, wherein a first group of straight evaluation lines within the first measurement path region and a second group of straight evaluation lines within the second measurement path region are predefined and/or determined. The evaluation lines of the first group are parallel to the first measurement spot path and the evaluation lines of the second group are parallel to the second measurement spot path, and each first group evaluation line has an intersection point with each second group evaluation line.

(Continued)

For each intersection point, a maximum greyscale value is determined, and relative degrees of reflectance of the measurements surface are determined at least on a subset of the intersection points, depending on these greyscale values.

18 Claims, 4 Drawing Sheets

(56) References Cited

U.S. PATENT DOCUMENTS

| | | | |
|---|---|---|---|
| 9,482,583 | B1 | 11/2016 | Zavodny et al. |
| 2006/0055934 | A1* | 3/2006 | Sunshine ........... G01N 15/0227 356/446 |
| 2014/0071443 | A1* | 3/2014 | Suzuki ................. G01N 21/892 356/237.2 |
| 2014/0320859 | A1 | 10/2014 | Thennadil et al. |
| 2019/0264953 | A1* | 8/2019 | Bern ....................... F24S 50/80 |

FOREIGN PATENT DOCUMENTS

| | | |
|---|---|---|
| DE | 102015217086 | 3/2017 |
| DE | 102016119000 | 4/2018 |
| DE | 102016226033 | 6/2018 |
| WO | 2016205612 | 12/2016 |

OTHER PUBLICATIONS

G.R. Bradski and J.W. Davis, "Motion segmentation and pose recognition with motion history gradients," Machine Vision and Applications 13 (3), pp. 174-184 (2002).

Nan Tu et al., "Selection of surface reflectance for solar cavity heat absorbers", Journal of Engineering Thermophysics, vol. 35., Issue 04, pp. 700-704, Apr. 15, 2014.

Larrouturou Florent et al., "Effect of directional dependency of wall reflectivity and incident concentrated solar flux on the efficiency of a cavity solar receiver", Solar Engery, vol. 109, pp. 153-164, Nov. 30, 2014.

* cited by examiner

METHOD FOR DETERMINING RELATIVE DEGREES OF REFLECTANCE OF A MEASUREMENT SURFACE

TECHNICAL FIELD

The invention relates to a method for determining relative reflectance values of the measurement surface.

BACKGROUND

Determining spatially resolved reflectance values of a measurement surface is desirable for many applications. Application examples are found in architecture, where they are used to measure the reflection of outer façades, in particular the reflection of solar radiation. The measurement of reflectance values in interior spaces, in particular from the walls and further large-area architectural objects in the interior is also desirable. Moreover, applications are found in science for measuring reflectance values of planar specimens. This comprises both static specimens and dynamic specimens, for example plants or other biological objects.

Furthermore, it is necessary to determine reflectance values of radiation receivers in solar-thermal tower power plants: to use solar energy, the practice of concentrating solar radiation on a radiation receiver by multiple reflectors is known. In the case of solar-thermal tower power plants, incident solar radiation is concentrated on a radiation receiver by reflectors that are embodied as heliostats. A spatially resolved measurement of reflectance values of an absorber surface of the radiation receiver is desirable for determining the quality of the radiation receiver, for detecting defects of the radiation receiver during running operation, and for optimizing the use of the sunlight: DE 10 2016 119 000 A1 has disclosed a solar-thermal tower power plant and a calibration method for aligning the heliostats of the tower power plant. DE 10 2016 226 033 A1 has disclosed a method for determining relative reflectance values of an absorber surface of a radiation receiver of a solar-thermal tower installation. In this case, a light spot is moved over the radiation receiver by a heliostat. During this movement, a camera is used to record a plurality of spatially resolved images. The absorber surface of the radiation receiver is divided into a plurality of segments and a maximum grayscale value is determined for each segment on the basis of the images of the camera. A relative reflectance value is assigned to each segment on the basis of the maximum grayscale values.

SUMMARY

The present invention is based on the object of facilitating a determination of relative reflectance values that is accelerated over the prior art or a determination with a higher spatial resolution.

This object is achieved by a method for determining relative reflectance values of a measurement surface having one or more of the features disclosed herein. Advantageous configurations are found in the description and claims that follow.

The method according to the invention for determining relative reflectance values of the measurement surface includes the following method steps:

In a method step A, measurement radiation is applied to the measurement surface such that a measurement spot arises on the measurement surface. In a method step B, the measurement spot is moved in accordance with a first path movement along at least one first straight measurement spot path. In a method step C, a first image set of a plurality of spatially resolved images of the measurement surface are recorded during the first path movement in accordance with step B and, in a method step D, relative reflectance values are determined for a plurality of localities of the measurement surface.

Like in the above-described methods known from the prior art, a measurement spot is consequently moved over the measurement surface and a plurality of spatially resolved images of the measurement surface are recorded during this path movement.

What is essential to the method according to the invention is that, in method step B, the measurement spot is additionally moved in a second path movement over the measurement surface at least along a second straight measurement spot path which is not parallel to the first measurement spot path, in such a way that a first measurement path region of the measurement surface, over which the measurement spot sweeps during the first path movement, at least partly overlaps with a second measurement path region of the measurement surface, over which the measurement spot sweeps during the second path movement.

In method step C, a second image set of a plurality of spatially resolved images of the measurement surface is recorded during the second path movement.

In method step D, an evaluation is carried out at points of intersection. The localities of the points of intersection on the measurement surface are defined by evaluation lines, wherein a first group of straight evaluation lines are specified and/or determined within the first measurement path region and at least a second group of straight evaluation lines are specified and/or determined within the second measurement path region. At least the first group has at least two evaluation lines that are spaced apart from one another. The evaluation lines of the first group are parallel to the first measurement spot path and the evaluation line or the evaluation lines of the second group are parallel to the second measurement spot path. Preferably, the second group, too, comprises at least two evaluation lines.

Each evaluation line of the first group has a point of intersection with at least one evaluation line of the second group, preferably with each evaluation line of the second group.

For each image set, a maximum grayscale value is determined at least for each point of intersection. In method step D, relative reflectance values of the measurement surface are determined at least at a subset of the points of intersection on the basis of these maximum grayscale values.

The method according to the invention consequently thus uses maximum grayscale values at points of intersection of the above-described evaluation lines in order to determine relative reflection values, at least at the locations of the points of intersection. This can obtain a higher measurement point density by an appropriate choice of the evaluation lines, and so this facilitates a method that is faster over the prior art or a determination of relative reflectance values with a higher spatial resolution. Furthermore, lower requirements are placed on the intensity profile; in particular, it is also possible to use a measurement spot with a plurality of local maxima.

Preferably, the locations of the points of intersection on the measurement surface are specified. As a result, the evaluation lines are also known, and evaluation can be implemented in uncomplicated fashion. Preferably, the first and the second measurement spot path on the measurement surface are also specified. The method can be easily carried out in this advantageous embodiment by way of a calibrated control of the element used to move the measurement spot.

In a further advantageous embodiment, the profile of at least one path movement, preferably of both path movements, is determined from the spatially resolved images. An advantage arising from this is that the respective measurement spot path need not be known in advance or, in any case, need not be exactly known in advance and, in particular, inaccuracies and errors of a calibration, in particular, do not have an effect on the result of the determination of the relative reflectance values. In particular, it is advantageous that the profile of the evaluation lines is specified relative to the profile of the path movements. As a result, the information required to carry out the method can be specified by simple specifications, for example the specification of the spacing of one or more evaluation lines extending parallel to the measurement spot path.

Each point of an evaluation line is impinged at least one time by the local maximum of the intensity distribution of the measurement spot, which local maximum is intersected by the evaluation line. Along the movement direction, all local maxima move with the same speed and form the front of the local maxima of all sections which cut through the intensity distribution of the measurement spot and which are arranged parallel to the movement direction. For evaluation lines parallel to the movement direction, the front of local maxima reproduces the respective global maximum for each evaluation line. If the front of the local maxima passes through a locality on an evaluation line (for example, a point of intersection), the maximum grayscale value is present for this locality at this time.

At least one measurement spot path is preferably determined from the associated image sets, particularly preferably both measurement spot paths are determined from the associated image sets, in particular as described below: to determine the measurement spot path, the time at which the maximum grayscale value occurs over the interval of the recording is determined for each locality. The time is preferably defined by way of the index of the recording, which runs proportional to the actual time. Times with increasing value are determined along the movement direction, in accordance with the temporal sequence of the impingement by the front of local maxima. This value base corresponds to the input parameter for the process for distinguishing movements and determining movement directions presented by Bradski and Davis (G. R. Bradski and J. W. Davis, "Motion segmentation and pose recognition with motion history gradients," Machine Vision and Applications 13 (3), 174-184 (2002)). Consequently, the movement direction of the measurement spot path is determined on the basis of the time gradients.

Advantageously, each group of evaluation lines comprises at least five, in particular at least ten, preferably at least fifty evaluation lines. A particular advantage of the method according to the invention lies in the fact that a high information density in respect of the relative reflectance values can be obtained with little outlay. In this case, number and spacing of the evaluation lines with respect to one another and from the associated measurement spot path can be adapted to the respective measurement situation and the size of the measurement spot. The more evaluation lines are specified, the more points of intersection arise, the latter representing the basis for determining the relative reflection values.

In addition to determining relative reflectance values at the points of intersection, however, the method according to the invention also offers the option of specifying the relative reflectance value continuously along at least one evaluation line, preferably along all evaluation lines. This is facilitated by virtue of being able to set up a system of equations on the basis of the evaluation lines intersecting at the points of intersection, and this facilitates the specification of the relative reflectance value along each evaluation line.

To simplify the evaluation, the images of each image set are advantageously each recorded from an identical recording location. In particular, for a simplification, it is advantageous if the recording location of the images of the first image set and the second image set is identical.

The images of the image sets are preferably recorded by a camera, particularly preferably by a spatially resolving electronic camera. Advantageously, there is an image sensor calibration of an image sensor of the camera before the images are recorded, in particular a dark image correction and/or a white image correction and/or a linearization. This simplifies the evaluation of the measurement data from the camera.

The method according to the invention offers the significant advantage of allowing an evaluation of relative reflectance values even in those regions that are not swept over by the absolute intensity maximum of a measurement spot. Additionally, other intensity distributions of the measurement spot, for example a Gaussian distribution, a constant distribution of the intensity or else an irregular, non-uniform intensity distribution within the area of the measurement spot are no obstacles to an application of the method according to the invention. An advantage arising as a result is that there are only few limitations in respect of the selection of the light source for producing the measurement spot.

In an advantageous embodiment, a reflector is used as a source for applying measurement radiation to a measurement surface, in particular a reflector that is rotatable, preferably rotatable about a plurality of axes, relative to the measurement surface. In this case, the measurement radiation is consequently produced by at least one light source, preferably by exactly one light source, and the measurement spot is moved over the measurement surface by the reflector. This is particularly advantageous if the method according to the invention is used to determine reflectance values of an absorber field of a solar-thermal tower power plant since one of the already existing heliostats can easily be used as a reflector.

Consequently, the scope of the invention includes, in particular, the use of the sun as light source for producing the measurement radiation.

Likewise, the scope of the invention includes the use of a profile emitter as a source for the measurement radiation. In particular, it is preferably possible to use profile emitters which have the greatest possible extent with a high intensity at least perpendicular to the measurement spot path such that a large region is swept over when the measurement spot is moved along the measurement spot path.

A laser is preferably used as a source for the measurement radiation; in particular, a laser beam produced by the laser is expanded by an optical expansion element, in particular expanded to a line profile. In this advantageous embodiment, the measurement spot is furthermore preferably moved transversely to the longitudinal extent of the line profile such that, as described above, a large area is swept over when the measurement spot is moved.

In a further preferred embodiment, a light source for producing the measurement radiation is moved relative to the measurement surface in order to move the measurement spot along the measurement spot path. This is advantageous, in particular, in the case of applications where, in uncomplicated fashion, a measurement source with a focused measurement beam for producing a measurement spot can be moved along the measurement surface.

In a further advantageous embodiment, the method steps A to D are carried out at at least two different recording locations, and angle-dependent relative reflectance values are determined for at least a subset of the points of intersection in an overall evaluation. Consequently, as a result of the different recording locations, it is not only spatially resolved information about the distribution of the relative reflectance values of the measurement surface that is obtained but, in addition thereto, a dependence in respect of the reflection angle is also determined. To this end, it is particularly advantageous to respectively carry out method steps A to D for a multiplicity of recording locations.

The method according to the invention is particularly suitable for determining relative reflectance values of large areas, for example the aforementioned absorber surface of the solar-thermal tower power plant or outer facades of a building. Likewise, the method according to the invention can be applied at smaller scales, in particular on a laboratory scale, for example for determining relative reflectance values of synthetically produced surfaces or biological surfaces.

BRIEF DESCRIPTION OF THE DRAWINGS

Further preferred features and embodiments are explained below on the basis of the figures and exemplary embodiments. In this context.

DETAILED DESCRIPTION

The figures show schematic illustrations that are not true to scale. In the figures, the same reference signs denote the same elements or elements with the same effect.

Figure 1:
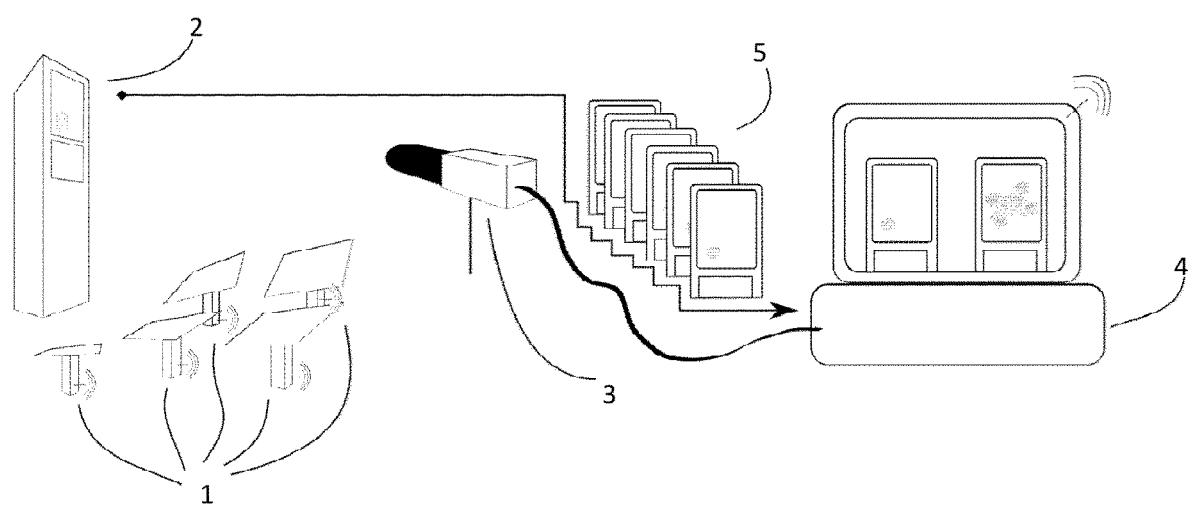
FIG. 1 shows a schematic illustration of the solar-thermal tower power plant, in which relative reflection values of an absorber surface of the solar tower are determined by an exemplary embodiment of the method according to the invention.

FIG. 1 shows a schematic illustration of the solar-thermal tower power plant. A group of reflectors 1, which are embodied as heliostats, are mounted on pylons so as to be pivotable about two axes by motorized drives. Furthermore, the tower power plant comprises a radiation receiver 2, which is arranged on a tower and which has a rectangular radiation aperture. Within the rectangular radiation aperture, the radiation receiver has an absorber that completely fills the radiation aperture, the absorber surface of said absorber being connected in a thermally conducting fashion to lines for a heat transport fluid.

By means of the heat transport fluid, the heat obtained by the concentration of sunlight on the radiation receiver 2 via the reflectors 1 is carried away for further use, for producing electricity in an energetic cycle in the present case.

The tower power plant furthermore comprises a camera 3 that is arranged in stationary fashion and directed at the radiation receiver in order to record spatially resolved images of the radiation receiver and that is connected to an evaluation unit 4 (a computer unit with processor, data memory, program memory, input devices such as keyboard and mouse, and output devices such as screen and loudspeaker in the present case).

To this end, the evaluation unit 4 is connected to the camera 3 via a data cable in order, firstly, to control the recordings of the camera 3 and, secondly, to receive the measurement images from the camera 3. Moreover, the evaluation unit 4 is connected by radio to the motorized drives for positioning the reflectors 1.

To operate the solar power plant, the evaluation unit 4 is embodied firstly as a tracking unit to make the reflectors 1 track a change in position of the sun such that the sunlight is always concentrated on the radiation receiver 2, independently of the position of the sun. Secondly, the evaluation unit 4 is embodied to carry out an exemplary embodiment, described below, of the method according to the invention for a spatially resolved determination of relative reflectance values of the absorber of the radiation receiver 2:

In one exemplary embodiment of the method according to the invention, a reflector 1 is controlled by the evaluation unit 4 in such a way that the reflected sunlight sweeps over the absorber surface, which represents the measurement surface in the present case, along a straight, horizontal path. The remaining reflectors 1 are aligned in such a way that no sunlight is reflected on the measurement surface.

The light reflected onto the measurement surface by the reflector 1 consequently represents the measurement spot and the above-described straight horizontal movement represents the first measurement spot path.

Subsequently, the measurement spot is additionally guided over the measurement surface along a vertical straight movement by the reflector 1 such that this second straight measurement spot path intersects the first measurement spot path. This is illustrated schematically in FIG. 2:

The measurement spot 7a is moved along the first measurement spot path 8a. The measurement spot 7a is illustrated at the start and end of the first measurement spot path 8a. Subsequently, the measurement spot is moved along the second measurement spot path 8b. Here, too, the measurement spot 7b is illustrated at the start and end of the second measurement spot path 8b. The arrows indicate the respective movement direction. The first and the second measurement spot path overlap, and so the measurement surface 6 is swept over both by measurement spot 7a and by measurement spot 7b in an intersection field 9.

A first image set 5 of spatially resolved images is recorded by the camera 3 during the first path movement, during which the measurement spot 7a is moved along the first measurement spot path 8a. These images are illustrated schematically in FIG. 1. In the present case, the images of the first image set are recorded at a rate of 40 Hz.

Likewise, a second image set of spatially resolved images is recorded at the same rate during the second path movement, during which the measurement spot 7b is moved along the second measurement spot path 8b.

The movement directions and starts and ends of the first and second measurement spot path are stored in the evaluation unit 4 in the present exemplary embodiment and are transmitted to the motorized drive of the heliostat 1 such that a corresponding rotational movement is carried out by the heliostat 1.

Figure 2:
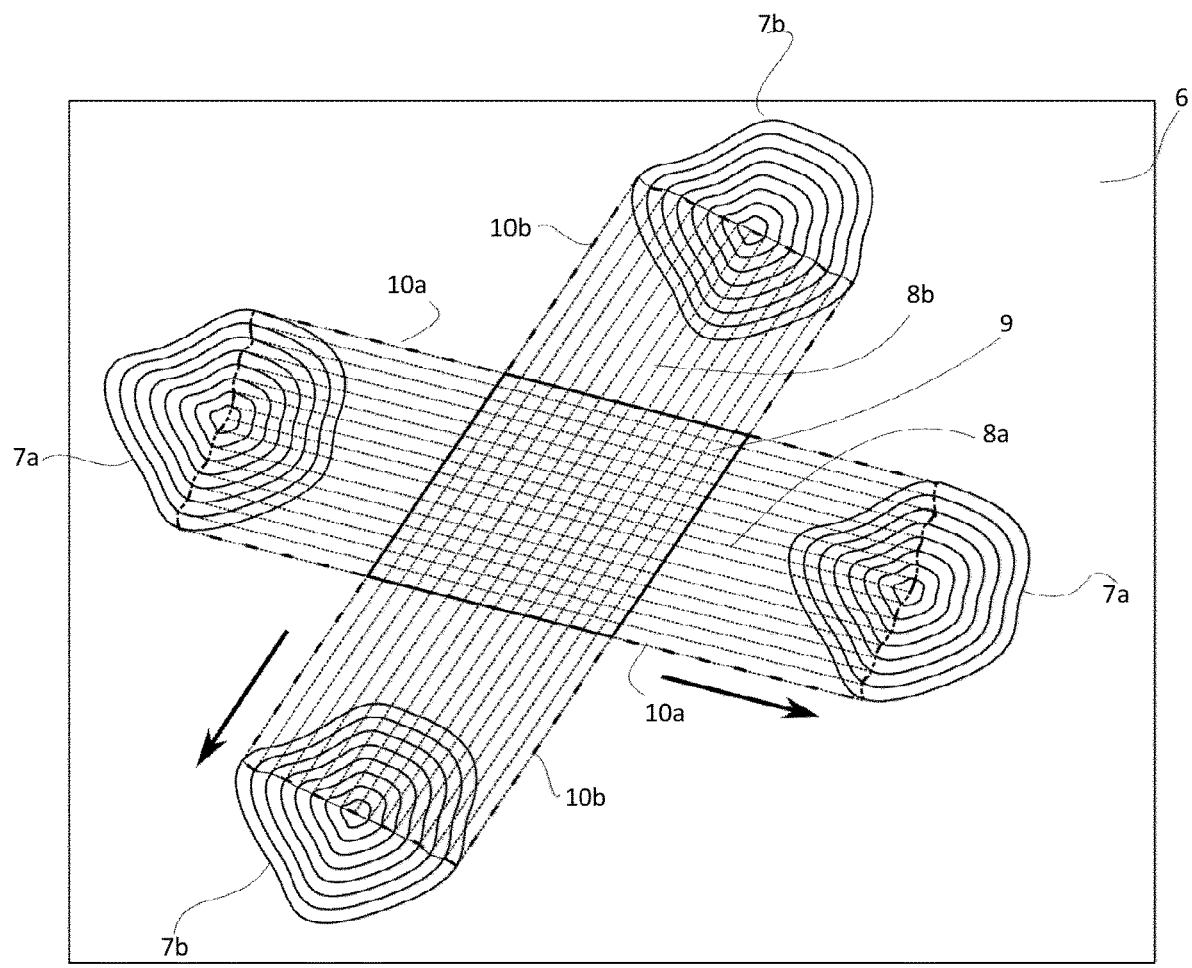
FIGS. 2 to 4 show schematic illustrations for explaining an exemplary embodiment of the method according to the invention.

The first and the second image set of spatially resolved images represent the measurement data, on the basis of which the relative reflectance values are determined as follows:

The determination is implemented on the basis of points of intersection of the evaluation lines arranged in parallel equidistant fashion on both sides of the measurement spot trajectories: these lines are illustrated using dashed lines in FIG. 2. The two outer evaluation lines 10a of the first group of evaluation lines and the two outer evaluation lines 10b of the second group of evaluation lines are labeled in exemplary fashion. These outer evaluation lines are respectively located on the boundary of the associated measurement path region. In the present case, the evaluation lines each have a distance of 7 mm from one another. In the present case, the measurement spot covers an area of approximately 5 m.

In the intersection field 9, the evaluation lines cross such that each evaluation line of the first group has a point of intersection with each evaluation line of the second group.

Figure 3:
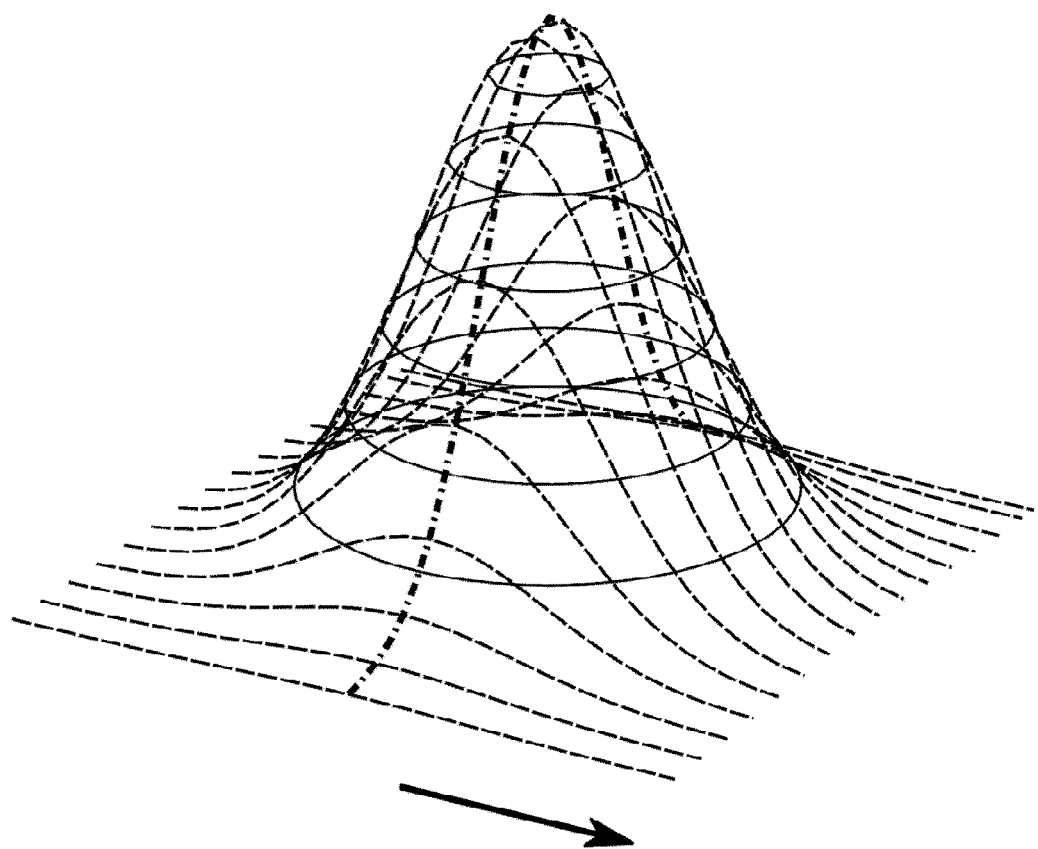

The measurement spot typically has an inhomogeneous intensity distribution. FIG. 3 illustrates, in perspective fashion, an idealized intensity distribution of a measurement spot with a central intensity maximum. The dashed lines represent the evaluation lines along the movement direction labeled by the arrow. The solid lines reproduce levels of same intensity. A dash-dotted line shows the front of the local maxima during the movement in the movement direction for the time illustrated in FIG. 3. When the front of the local maxima passes through a locality on an evaluation line (e.g., a point of intersection), the maximum grayscale value for this locality is present at this time.

However, such a homogeneous intensity profile is only seldom achieved in practical applications. An advantage of the present invention is that the method is likewise applicable in the case of inhomogeneous and unknown intensity profiles. Therefore, the measurement spots 7a, 7b are shown as irregular concentric rings in FIGS. 1 and 4. The ring lines in each case symbolize a level of unchanging intensity. Likewise, the front of the local maxima along the movement direction is respectively illustrated by a dashed line in FIGS. 2 and 4. Due to the inhomogeneous intensity distribution, this front generally does not represent a straight line.

Points lying in succession along the movement direction image the same section of the inwardly radiating distribution. Consequently, under the assumption of an unchanging incident radiation density distribution of the measurement spot, the same local maximum of the radiation density is reflected from the points lying along this line. Thus, for example, the maximum intensity of all points of intersection of one evaluation line of the first group of evaluation lines corresponds to the associated local maximum of the maximum front of the first measurement spot 7a in the case of the first path movement. Consequently, the absolute intensity with which the points on an evaluation line and, in particular, the points of intersection on this evaluation line are impinged upon along this evaluation line is unknown. However, it is known that the maximum intensity with which these points are impinged by the measurement radiation during the first path movement is the same under the aforementioned conditions.

The same applies accordingly to the second path movement.

Figure 4:
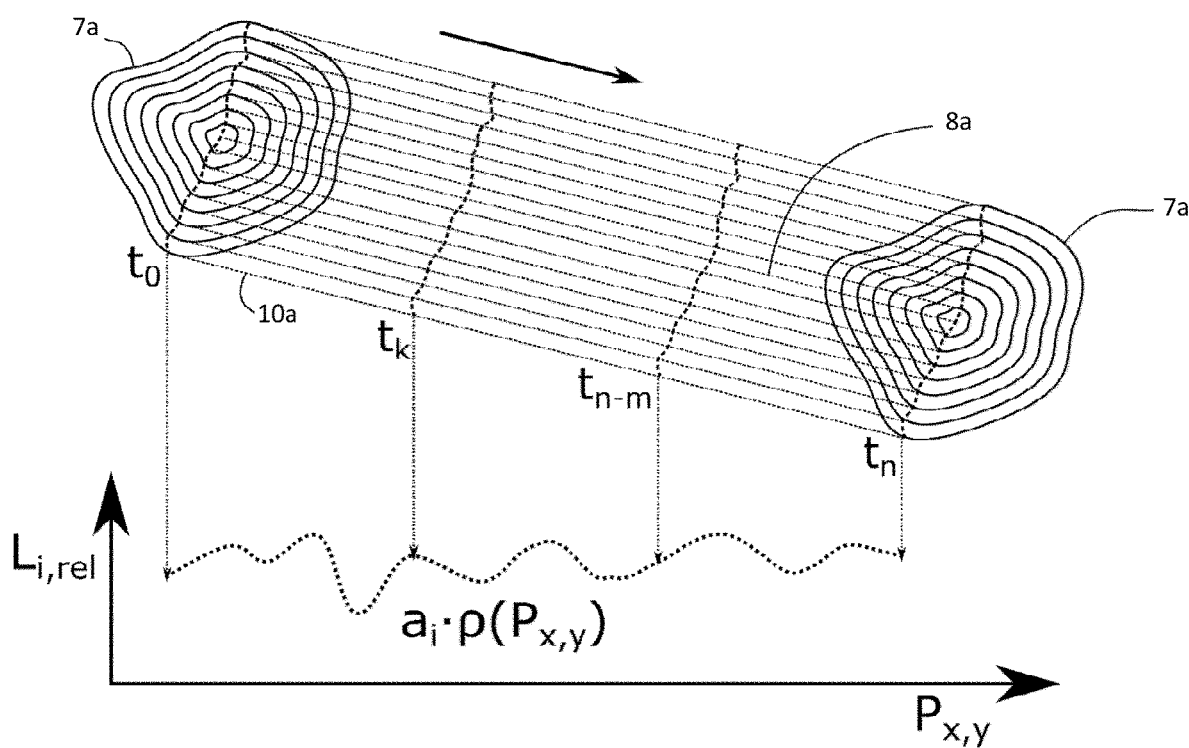

Provided that (in an idealized case) the measurement surface along an evaluation line has a constant reflectivity, a constant maximum reflected intensity and, accordingly, a constant maximum grayscale value are to be expected along the evaluation line when evaluating all images of the associated image set for this measurement point. Therefore, the relative reflectance values in the case of a locally inhomogeneous reflectivity can also be deduced from the maximum grayscale values, in particular of the point of intersection:

FIG. 4 schematically illustrates a measurement result for a non-ideal measurement surface with locally inhomogeneous reflectance values: the measurement spot 7a is moved along the first measurement spot path 8a in the direction indicated by the arrow. The front of the local maxima sweeps over the point $P_{x,y}$ at the time $t_i$. Times $t_0$, $t_k$, $t_{n-m}$ and $t_m$ are plotted in exemplary fashion (for an image set with n+1 images (i=0, . . . n)), in each case with the associated front of local maxima which is illustrated using a dashed line. The arrows reference the relative intensity $L_{i,rel}$ for these times.

As in FIG. 2, the evaluation lines are represented by dashed lines. In the lower region, the maximum grayscale value is illustrated in schematic fashion for each point on the evaluation line 10a, the grayscale value being ascertained for the respective point from the first image set. A horizontal straight line is expected in the case of a completely homogenous absorber. A corresponding variation in the maximum grayscale values is to be expected in the realistic case of an inhomogeneous absorber, as illustrated schematically in the lower region of FIG. 4. Consequently, a maximum grayscale value is assigned to each point $P_{x,y}$ along the evaluation line 10a in accordance with the first image set, said maximum grayscale value corresponding to reflected light intensity. Consequently, the ratio of the maximum grayscale values of two different points with respect to one another reproduces the ratio of the reflectance of these two points.

On an evaluation line i, the maximum reflected radiation intensity when carrying out the first path movement consequently corresponds to the product of the maximum measurement beam intensity and the reflectance $\rho(P_{x,y})$ at this point $P_{x,y}$. Apart from a proportionality factor $a_i$, the maximum measurement beam intensity in turn corresponds to the maximum grayscale value for this point.

What is now decisive is that an equation can be set up for each point of intersection from the first path movement and from the second path movement, as described above. In this case, the reflectance of the point of intersection is the same during the first and the second path movement since the reflectance of the impinged surface at point of intersection does not change. Once again, the maximum radiation intensity is the same for all points located on one evaluation line, as described above. The reflected maximum intensity emerges, apart from a proportionality factor, from the maximum grayscale value for this point determined in the respective image set.

Therefore, even in the case of a system of only two evaluation lines per group and hence four points of intersection, an overdetermined system of equations is present, which facilitates the determination of the relative reflectance value for each point of intersection.

Due to measurement errors or variations in the intensity or intensity distribution of the measurement spot during a path movement, it is advantageous to determine the relative reflectance values at the points of intersections by way of the overdetermined system of the equations using mathematical processes known per se, for example by error minimization.

Consequently, the relative reflectance values are available, at least for the point of intersection, after the method has been carried out. In a manner known per se, a normalization can be implemented in order to determine the absolute reflectance values, for example by determining direct normal irradiance (DNI) and normalizing the maximum grayscale values by the DNI values in the present case. Here, a change in the DNI values during a path movement is preferably taken into account such that errors due to intensity variations during the measurement are corrected.

Alternatively, a normalization can be implemented by virtue of a reference sample measured previously in the laboratory using known means being arranged on the measurement surface, the relative reflectance value being related to said reference sample.

As described above, the solution of the overdetermined system of equations facilitates the determination of the relative reflectance values at the points of intersections. However, as likewise described above, the ratio of the maximum grayscale values of two different points along an evaluation line corresponds to the ratio the relative reflectance values. Consequently, the present method easily allows a specification of the relative reflection values not only at the points of intersection but along all pixels along an evaluation line, at which grayscale values were measured.

LIST OF REFERENCE SIGNS

1 Heliostats
2 Radiation receiver
3 Camera
4 Evaluation unit
5 First image set of spatially resolved images
6 Measurement surface
7a, 7b Measurement spot
8a First measurement spot path
8b Second measurement spot path
9 Intersection field
10a, 10b Evaluation lines

The invention claimed is:

1. A method for determining relative reflectance values of a measurement surface (6), the method comprising the steps of:
  A. applying measurement radiation to the measurement surface (6) such that a measurement spot (7a, 7b) arises on the measurement surface (6),
  B. moving the measurement spot in accordance with a first path movement over the measurement surface (6) along at least one first straight measurement spot path (8a),
  C. recording a first image set of a plurality of spatially resolved images of the measurement surface (6) during the first path movement in accordance with step B, and
  D. determining relative reflectance values for a plurality of localities on the measurement surface (6),
  wherein, method step B further comprises additionally moving the measurement spot (7a, 7b) in a second path movement over the measurement surface (6) at least along a second straight measurement spot path (8b) which is not parallel to the first measurement spot path (8a), such that a first measurement path region of the measurement surface (6), over which the measurement spot (7a, 7b) sweeps during the first path movement, at least overlaps with a second measurement path region of the measurement surface (6), over which the measurement spot (7a, 7b) sweeps during the second path movement,
  method step C further comprises recording a second image set of a plurality of spatially resolved images of the measurement surface (6) during the second path movement, and
  method step D further comprises carrying out an evaluation at points of intersection, the localities of which on the measurement surface (6) are defined by straight evaluation lines (10a, 10b), wherein a first group of the straight evaluation lines are at least one of specified or determined within the first measurement path region and at least a second group of the straight evaluation lines are at least one of specified or determined within the second measurement path region, and at least the first group has at least two of the evaluation lines that are spaced apart from one another, the evaluation lines of the first group are parallel to the first measurement spot path and the evaluation line or the evaluation lines of the second group is parallel to the second measurement spot path, and each of the evaluation lines of the first group has a point of intersection with at least one of the evaluation lines of the second group,
  for each image set, determining a maximum grayscale value at least for each said point of intersection, and
  determining relative reflectance values of the measurement surface (6) at least at a subset of the points of intersection based on these maximum grayscale values.

2. The method as claimed in claim 1, further comprising specifying the locations of the points of intersection on the measurement surface (6).

3. The method as claimed in claim 1, further comprising determining a profile of at least one of the path movements from the spatially resolved images.

4. The method as claimed in claim 3, further comprising specifying a profile of the evaluation lines relative to the profile of the path movements.

5. The method as claimed in claim 1, wherein each of the groups of the evaluation lines (10a, 10b) comprises at least 5 of the evaluation lines (10a, 10b).

6. The method as claimed in claim 1, wherein the spatially resolved images of each of the image sets are each recorded from an identical recording location.

7. The method as claimed in claim 6, wherein the recording location of the images of the first image set and the second image set is identical.

8. The method as claimed in claim 1, wherein the spatially resolved images of the image sets are recorded by a camera (3) and the method further comprises carrying out an image sensor calibration of an image sensor of the camera (3) before the images are recorded.

9. The method as claimed in claim 8, wherein the image sensor calibration includes at least one of a dark image correction or a white image correction.

10. The method as claimed in claim 1, further comprising using a reflector as a source for applying measurement radiation to the measurement surface.

11. The method as claimed in claim 10, wherein the reflector is rotatable relative to the measurement surface (6).

12. The method as claimed in claim 1, further comprising using a profile emitter as a source for the measurement radiation.

13. The method as claimed in claim 1, further comprising using a laser as a source for the measurement radiation.

14. The method as claimed in claim 13, further comprising expanding a laser beam produced by the laser using an optical expansion element to form an expanded to a line profile.

15. The method as claimed in claim 1, further comprising moving a light source for producing the measurement radiation relative to the measurement surface (6).

16. The method as claimed in claim 1, wherein the method steps A to D are carried out for at least two different recording locations, and angle-dependent relative reflectance values are implemented for at least a subset of the points of intersection in an overall evaluation.

17. The method as claimed in claim 1, further comprising using the method to determine relative reflectance values of an absorber surface of a solar tower.

18. The method as claimed in claim 17, wherein the solar tower is impinged with radiation by a heliostat.

\* \* \* \* \*